(12) United States Patent
Gaiser

(10) Patent No.: US 11,698,012 B2
(45) Date of Patent: *Jul. 11, 2023

(54) EXHAUST GAS HEATING ELEMENT

(71) Applicant: Purem GmbH, Neunkirchen (DE)

(72) Inventor: Gerd Gaiser, Reutlingen (DE)

(73) Assignee: PUREM GMBH, Neunkirchen (DE)

(*) Notice: Subject to any disclaimer, the term of this patent is extended or adjusted under 35 U.S.C. 154(b) by 156 days.

This patent is subject to a terminal disclaimer.

(21) Appl. No.: 16/750,202

(22) Filed: Jan. 23, 2020

(65) Prior Publication Data

US 2020/0240305 A1  Jul. 30, 2020

(30) Foreign Application Priority Data

Jan. 24, 2019 (DE) .................. 10 2019 101 679.7

(51) Int. Cl.
*F01N 3/20* (2006.01)
*B01D 53/94* (2006.01)
(Continued)

(52) U.S. Cl.
CPC ......... *F01N 3/2013* (2013.01); *B01D 53/944* (2013.01); *B01D 53/945* (2013.01); *B01D 53/9418* (2013.01); *B01J 23/22* (2013.01); *B01J 23/42* (2013.01); *B01J 23/44* (2013.01); *B01J 23/464* (2013.01); *B01J 29/072* (2013.01); *B01J 29/80* (2013.01); *F01N 3/0293* (2013.01);
(Continued)

(58) Field of Classification Search
CPC .. F01N 3/2033; F01N 2240/16; F01N 3/0293; F01N 3/2803; F01N 2370/04; F01N 3/0256; F01N 3/38; F01N 3/10; F01N 3/20; B01D 53/9418; B01D 53/944; B01D 53/945; B01D 2255/1021; B01D 2255/1023; B01D 2255/1025; B01D 2255/50; B01J 23/22; B01J 23/42; B01J 23/44; B01J 23/464; B01J 29/072; B01J 29/80; B01J 2029/062; H05B 3/46; Y02T 10/12

See application file for complete search history.

(56) References Cited

U.S. PATENT DOCUMENTS

| 2005/0274107 | A1 | 12/2005 | Liu et al. |
| 2006/0054133 | A1* | 3/2006 | Vogt ...................... F02B 37/004 123/317 |
| 2010/0290957 | A1* | 11/2010 | Yoshida .................. F01N 3/106 422/109 |
| 2014/0360162 | A1* | 12/2014 | Gonze ................... F01N 3/2013 60/274 |

(Continued)

FOREIGN PATENT DOCUMENTS

| CN | 100419227 C | 9/2008 |
| CN | 107035463 A | 8/2017 |

(Continued)

OTHER PUBLICATIONS

Machine Translation of KR-20120117457-A (Year: 2012).*

Primary Examiner — Brandon D Lee
(74) Attorney, Agent, or Firm — McGlew and Tuttle, P.C.

(57) ABSTRACT

An exhaust gas heating unit for an exhaust system of an internal combustion engine includes a jacket heating conductor element (12) with a jacket (16) and with an electrical heating conductor (14). The electrical heating conductor (14) extends in the jacket (16) and is surrounded by insulating material (18). A heat transfer surface formation (20) is arranged on an outer side of the jacket (16) and is in heat transfer contact with same.

12 Claims, 7 Drawing Sheets

(51) Int. Cl.
*B01J 23/22* (2006.01)
*B01J 23/42* (2006.01)
*B01J 23/44* (2006.01)
*B01J 23/46* (2006.01)
*B01J 29/072* (2006.01)
*B01J 29/80* (2006.01)
*F01N 3/029* (2006.01)
*F01N 3/28* (2006.01)
*H05B 3/46* (2006.01)
*B01J 29/06* (2006.01)

(52) U.S. Cl.
CPC ......... *F01N 3/2033* (2013.01); *F01N 3/2803* (2013.01); *H05B 3/46* (2013.01); *B01D 2255/1021* (2013.01); *B01D 2255/1023* (2013.01); *B01D 2255/1025* (2013.01); *B01D 2255/20723* (2013.01); *B01D 2255/50* (2013.01); *B01J 2029/062* (2013.01); *F01N 2240/16* (2013.01); *F01N 2370/04* (2013.01)

(56) References Cited

U.S. PATENT DOCUMENTS

| | | |
|---|---|---|
| 2015/0128575 A1 | 5/2015 | Schmitt |
| 2017/0273146 A1* | 9/2017 | Everly ................ B01D 53/944 |
| 2018/0119591 A1* | 5/2018 | Everly ...................... F23G 7/00 |
| 2018/0334939 A1* | 11/2018 | Mital .................... F01N 3/2066 |
| 2019/0170039 A1* | 6/2019 | Hirth ...................... F01N 3/027 |
| 2020/0047145 A1* | 2/2020 | Kim ........................... F01N 5/02 |
| 2020/0200060 A1* | 6/2020 | Everly ...................... H05B 3/48 |

FOREIGN PATENT DOCUMENTS

| | | |
|---|---|---|
| CN | 107152327 A | 9/2017 |
| DE | 10 2014 115 923 A1 | 5/2016 |
| DE | 10 2016 110 320 A1 | 12/2017 |
| EP | 2 256 312 A1 | 12/2010 |
| KR | 20120117457 A * | 10/2012 |
| KR | 20120117457 A | 10/2012 |
| WO | 2017151975 A1 | 9/2017 |

* cited by examiner

EXHAUST GAS HEATING ELEMENT

CROSS REFERENCE TO RELATED APPLICATIONS

This application claims the benefit of priority under 35 U.S.C. § 119 of German Application 10 2019 101 679.7, filed Jan. 24, 2019, the entire contents of which are incorporated herein by reference.

TECHNICAL FIELD

The present invention pertains to an exhaust gas heating element for an exhaust system of an internal combustion engine.

TECHNICAL BACKGROUND

The increasingly stringent requirements in regard to the emission of harmful substances of internal combustion engines require special actions, which ensure that the emission of harmful substances can be reduced even in the start phase of an internal combustion engine in case of cold components of an exhaust system. In such a start phase, especially the catalytic converter units arranged in an exhaust system, for example, a three-way catalytic converter, an oxidation catalytic converter or an SCR catalytic converter, are at a temperature that is generally not sufficient to trigger the catalytic reaction to be carried out therein. In order to prevent this problem, the injection of fuel may take place at a later time to increase the exhaust gas temperature and thus to reach a faster heating of such catalytic converters or even particle filters, for example, in case of diesel internal combustion engines or the ignition angle may be set to late in case of spark-ignition internal combustion engines, which, however, makes major interventions in engine management necessary.

SUMMARY

An object of the present invention is to provide an exhaust gas heating unit for an exhaust system of an internal combustion engine, which makes possible an efficient heating of system areas of the exhaust system especially in a start phase of an internal combustion engine.

This object is accomplished according to the present invention by an exhaust gas heating unit for an exhaust system of an internal combustion engine, comprising:
 a jacket heating conductor element with a jacket and with an electrical heating conductor which extends in the jacket and is surrounded by insulating material, and
 a heat transfer surface formation which is arranged on an outer side of the jacket and is in heat transfer contact with same.

The use of such a high-temperature-resistant jacket heating conductor element makes it possible to provide very high temperatures in the range of 600° C. to 800° C. at the jacket of the jacket heating conductor element and thus also in the area of the heat transfer surface formation which is in heat transfer contact with the jacket. This provided thermal energy can be utilized to heat system areas of the exhaust system, for example, by this thermal energy being transported from the exhaust gas flowing around the exhaust gas heating unit to such system areas.

For a good transfer of heat between the jacket and the heat transfer surface formation in the case of a configuration that is nevertheless stable, it is proposed that the jacket be made of a metallic material, or/and that the heat transfer surface formation be connected to the jacket in a frictionally engaged manner, preferably by pressing on or shrinking on, or/and by connection in substance, preferably by welding or soldering.

The heat transfer surface formation may comprise at least one heat transfer element that surrounds the jacket heating conductor element in a helical manner and preferably provides heat transfer surfaces which are at right angles to an outer circumferential wall of the jacket. Because of this helical configuration, a large surface is provided for the thermal interaction with the exhaust gas flowing around the exhaust gas unit heating unit with a lower number of components and thus a configuration that can be embodied in a simple manner.

For a good thermal interaction of the exhaust gas heating unit, it is proposed that the jacket heating conductor element be configured as extending linearly in at least some areas, or/and that the jacket heating conductor element be configured as extending in a helical manner (with a helical configuration) or/and in a spiral-like manner (with a spiral configuration) in at least some areas, or/and that the jacket heating conductor element be configured as extending in a meandering manner (with a meandering configuration) in at least some areas.

In an alternative configuration, the heat transfer surface formation may comprise a plurality of plate-like (plate-shaped) heat transfer elements, which are arranged each at a spaced location from one another.

In order to keep the flow resistance low here, but yet to guarantee a good heat transfer capacity, it is proposed that the heat transfer elements be arranged essentially parallel to one another, or/and that a spacing element, which is in contact with the heat transfer elements or/and is connected to same, be arranged between at least two heat transfer elements, preferably between all heat transfer elements that are directly adjacent to one another.

At least one spacing element, preferably each spacing element may essentially fully cover the heat transfer element arranged on both sides of same at the surface areas thereof, which surface areas are located opposite one another. For a connection that is stable and yet guarantees a good heat transfer, it is proposed that at least one spacing element, preferably each spacing element be configured with a wave-like (wave-shaped) structure and be in contact with the heat transfer elements arranged on both sides of same with wave crest areas, or/and be connected to same. A good flow of exhaust gas around all surface areas is guaranteed when at least one spacing element, preferably each spacing element is permeable to exhaust gas. For example, provisions may be made for such a spacing element to be configured as a wire mesh, as a perforated metal plate or as expanded metal.

To couple the jacket heating conductor element to the plate-shaped heat transfer elements, it is proposed that at least one jacket heating conductor element receptacle, preferably a plurality of jacket heating conductor element receptacles receiving at least one jacket heating conductor element be provided in at least one heat transfer element, preferably in each heat transfer element.

In order to hereby guarantee an efficient transfer of heat from the jacket heating conductor element to the plate-shaped heat transfer elements, provisions may further be made for at least one jacket heating conductor element receptacle, preferably each jacket heating conductor element receptacle to be open toward a heat transfer element circumferential edge area in case of at least one heat transfer element, preferably in case of each heat transfer element, or/and for at least one jacket heating conductor element receptacle, preferably a plurality of jacket heating conductor element receptacles to be each provided at heat transfer element circumferential edge areas, which are located opposite one another or extend bent at an angle in relation to one another, in case of at least one heat transfer element, preferably in case of each heat transfer element, or/and for at least one pair of heat transfer elements, preferably a plurality of pairs of heat transfer elements to be provided, wherein the jacket heating conductor element is positioned such that it meshes with at least one jacket heating conductor element receptacle of each heat transfer element of the at least one pair of heat transfer elements.

In an especially advantageous variant of the exhaust gas heating unit according to the present invention, a heat transfer surface of the heat transfer surface formation may be formed with catalytically active material in at least some areas. The exhaust gas heating unit is thus used not only for heating, but also to use the heat provided therein directly for carrying out a catalytic reaction.

For example, at least one heat transfer element, preferably each heat transfer element of the heat transfer surface formation may be coated with catalytically active material.

For a stable bonding of such a coating to a heat transfer element, it is advantageous when the at least one heat transfer element is made of aluminum material, preferably an aluminum alloy, e.g., FeCrAlloy 1.4767.

Especially if the exhaust gas heating unit shall be active as a three-way catalytic converter unit or as a diesel oxidation catalytic converter unit, the catalytically active material may comprise:
  platinum, or/and
  palladium, or/and
  rhodium.

If the exhaust gas heating unit shall be active as an SCR catalytic converter unit, the catalytically active material may comprise:
  iron zeolite material, or/and
  copper zeolite material, or/and
  vanadium oxide material.

The present invention further pertains to an exhaust system for an internal combustion engine, comprising at least one exhaust gas heating element configured according to the present invention, which is arranged in an exhaust gas flow duct.

In order to be able to efficiently utilize the heat that is provided in the exhaust gas heating unit and is transferred to the exhaust gas in the exhaust system, the exhaust gas heating element is preferably arranged in an exhaust gas flow direction in the exhaust gas flow duct upstream in relation to an exhaust gas treatment unit, especially a catalytic converter unit or a particle filter unit.

Especially if the exhaust gas heating unit itself is configured as catalytically active, it is advantageous if the catalytically active material and the catalytic converter unit are associated with the same type of catalytic converter. This means that if, for example, the exhaust gas heating unit shall be active as a three-way catalytic converter unit and for this reason is coated or configured with corresponding catalytically active material, the catalytic converter unit arranged downstream thereof is also of the type of the three-way catalytic converter unit. Thus, for example, in a start phase the exhaust gas heating unit, which is heated very rapidly by the jacket heating conductor element, may be active as a catalytic converter unit, even if the three-way catalytic converter unit following downstream is not yet catalytically active because the temperature is too low.

For an even faster heating of the exhaust system, it is proposed that a hydrocarbon release device be associated with at least one exhaust gas heating unit for releasing hydrocarbon into the exhaust gas stream upstream in relation to the exhaust gas heating element. The hydrocarbon reacting on the hot surface of the exhaust gas heating unit, i.e., for example, gasoline or diesel, releases during its reaction a considerable amount of heat which heats the exhaust gas flowing there in the surrounding area of the exhaust gas heating unit and thus supports an efficient heating of system areas located farther downstream.

The present invention will be described in detail below with reference to the attached figures. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF PREFERRED EMBODIMENTS

Figure 1:
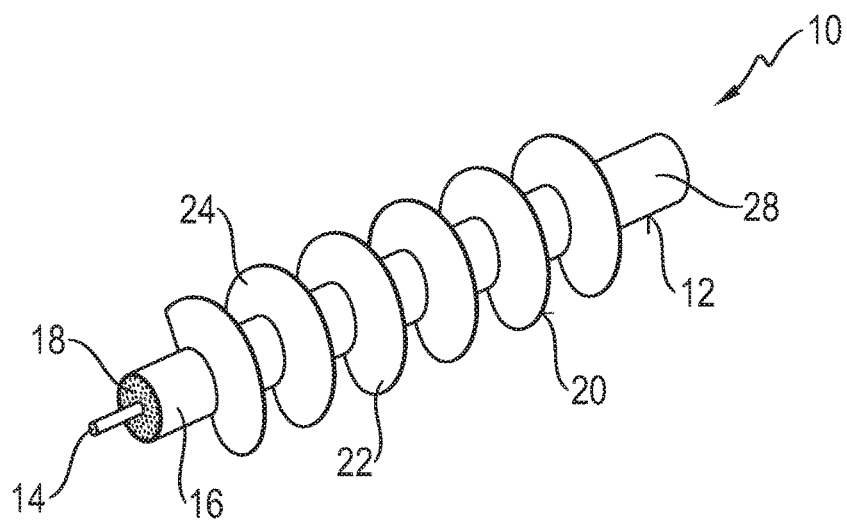
FIG. 1 is a perspective view of a section of an exhaust gas heating unit comprising a high-temperature-resistant jacket heater.
Figure 2:
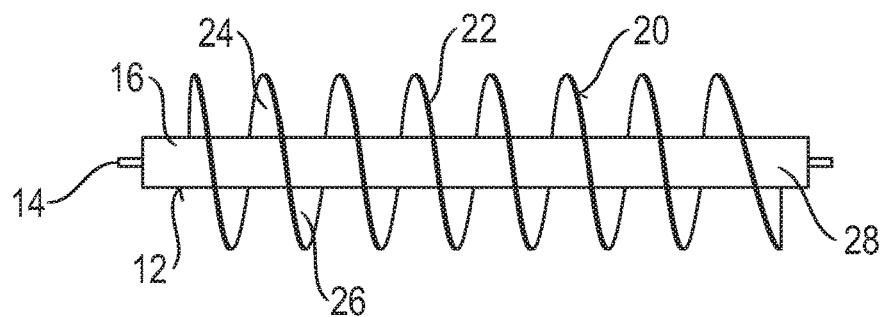
FIG. 2 is a side view of the exhaust gas heating unit according to FIG. 1.

Referring to the drawings, FIGS. 1 and 2 show an exhaust gas heating unit 10 for an exhaust system of an internal combustion engine. The exhaust gas heating unit 10 comprises an especially high-temperature-resistant jacket heating conductor element 12 with a heating conductor 14 arranged in a core area of same. The heating conductor 14 may comprise one or more heating wires and is surrounded by an insulating material 18, for example, ceramic material, in an interior surrounded by a jacket 16.

A heat transfer surface formation 20 is arranged on an outer surface 28 of the jacket 16, which is made of a metallic material, for example, a steel material. In the exemplary embodiment shown, the heat transfer surface formation 20 comprises a heat transfer element 22, which encloses the jacket heating conductor element 12 in a helical manner and is connected to the outer surface 28 thereof. The heat transfer element 22, which has a helical configuration, provides heat transfer surfaces 24, 26, around which exhaust gas can flow and at which the heat absorbed by the jacket 16 can be transferred to the exhaust gas, on both sides, which are oriented essentially in the direction of longitudinal extension of the jacket heating conductor element 12. Of course, a transfer of heat to the exhaust gas flowing around the jacket 16 also takes place in the area of the outer surface 28 of the jacket 16.

The heat transfer element 22, which extends in a helical manner, is connected preferably by connection in substance, for example, by soldering or welding, to the outer surface 28 of the jacket 16. This may also be supported or, as an alternative, be provided by the heat transfer element 22 being pressed onto or shrunk onto the jacket 16.

A very large overall area is provided for the heat transfer surface by a single component with the structure of the heat transfer element 22, which structure has a helical configuration. It should be pointed out that a similar configuration may also be achieved if a plurality of heat transfer elements, which have a ring-washer-like configuration, are arranged at the outer circumferential surface 28 of the jacket 16, for example, at an essentially uniformly spaced location to one another. A plurality of individual heat transfer elements, every one of which has to be fixed to the outer surface 28 of the jacket 16, are to be provided in this case, however.

Figure 3:
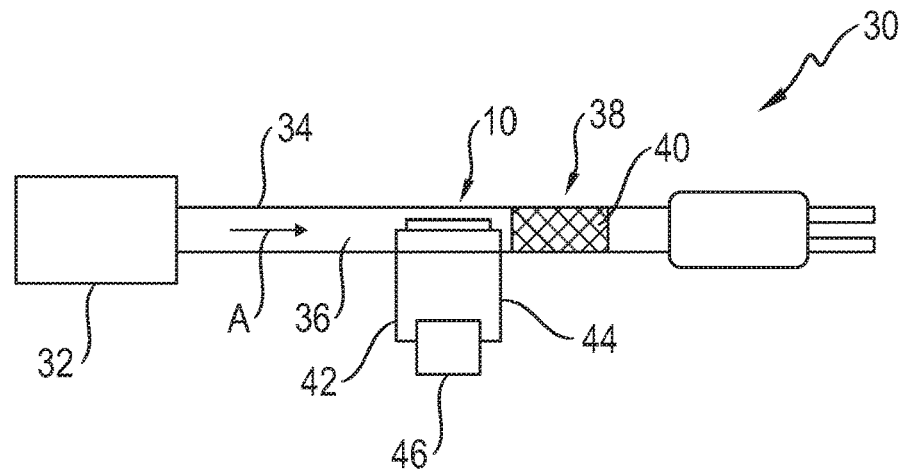
FIG. 3 is a schematic view of an exhaust system with an exhaust gas heating unit.

FIG. 3 shows in a schematic diagram the configuration of an exhaust system 30 for an internal combustion engine 32. The exhaust system 30 comprises an exhaust gas duct 36 in a one-part or multipart exhaust gas pipe 34. An exhaust gas heating unit 10, which may have, for example, the configuration described above with reference to FIGS. 1 and 2, is arranged upstream in relation to an exhaust gas treatment unit 38, for example, in relation to a catalytic converter unit 40. In the exemplary embodiment shown, the exhaust gas heating unit 10 or the jacket heating conductor element 12 thereof is arranged upstream of the exhaust gas treatment unit extending essentially elongated or linearly in the exhaust gas flow direction in the exhaust gas duct 36. At both longitudinal ends of the exhaust gas heating unit 10, this exhaust gas heating unit 10 is in contact with electrical lines 42, 44, via which the exhaust gas heating unit 10 is connected to the voltage source 46.

The exhaust gas heating unit 10 can be energized by applying an electric voltage, especially in a start phase of the internal combustion engine 32, in which the exhaust system 30, especially also the catalytic converter unit 14, is cold and thus a catalytic reaction cannot be triggered therein, so that the jacket heating conductor element 12 and also the heat transfer surface formation 20 are heated. The exhaust gas coming into contact with the heat transfer surfaces 24, 26 or with the outer surface 28 absorbs heat and transports this heat to the catalytic converter unit 40, so that it is guaranteed that the catalytic converter unit 40 is heated faster and the temperature at which the catalytic reaction can start is thus reached more rapidly in case of a still comparatively low exhaust gas temperature or as a support for the thermal energy already being transported in the exhaust gases.

Figure 4:
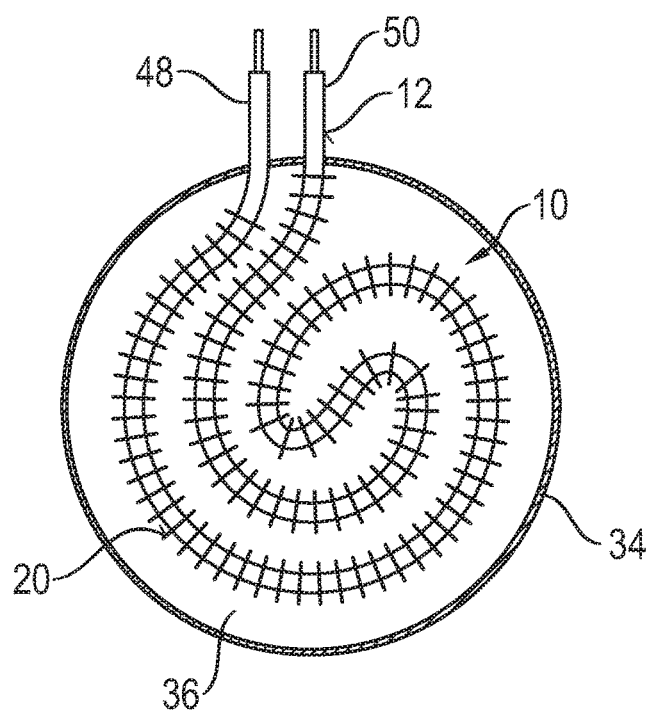
FIG. 4 is a sectional view of an exhaust gas heating unit in an exhaust gas duct, viewed in the exhaust gas flow direction.

FIGS. 4 through 7 show different arrangements in space of such an exhaust gas heating unit 10 in the exhaust gas duct 36. Thus, for example, FIG. 4 shows a configuration of the jacket heating conductor element 12 with the heat transfer surface formation 20 provided at the outer circumferential surface 28 thereof, which configuration is wound essentially in a plane that is at right angles to the exhaust gas flow direction A, especially wound like a double helix.

The two ends 48, 50 of the jacket heating conductor element 12, which ends are exposed to the electrical contacting outside of the exhaust gas pipe, are in the same length area of the exhaust gas pipe 34 and can thus be connected electrically to the voltage source 46 in a simple manner.

Figure 5:
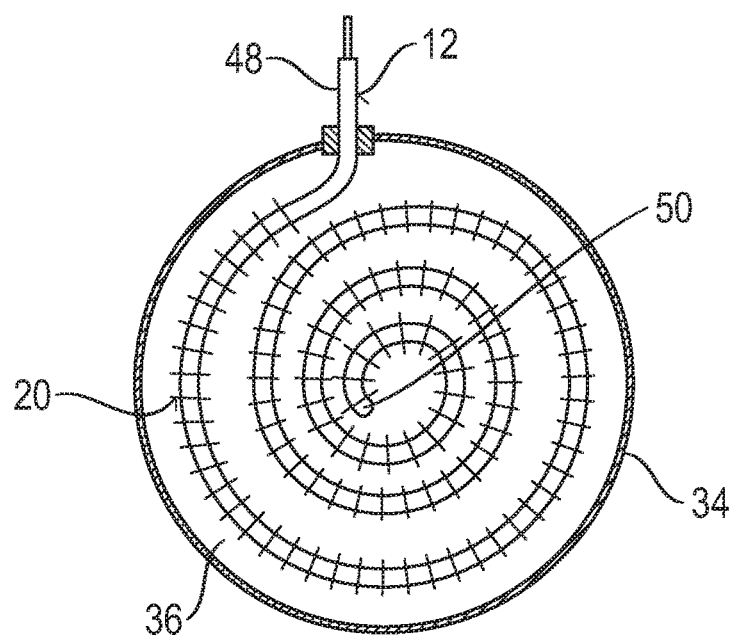
FIG. 5 is a sectional view, corresponding to FIG. 4, of another alternative arrangement of the exhaust gas heating unit.

FIG. 5 shows a configuration, in which the jacket heating conductor element 12 is again wound in a single helix in a plane that is essentially at right angles to the exhaust gas flow direction A. The heating conductor 14, which is arranged in the jacket heating conductor element 12, has in this configuration two heating wires, which run next to one another and merge into one another at the end 50 of the jacket heating conductor element 12, which end 50 is positioned in the central area, so that both heating wires can be contacted at the end 48 of the jacket heating conductor element 12, which end 48 is outside of the exhaust gas pipe 34.

Figure 6:
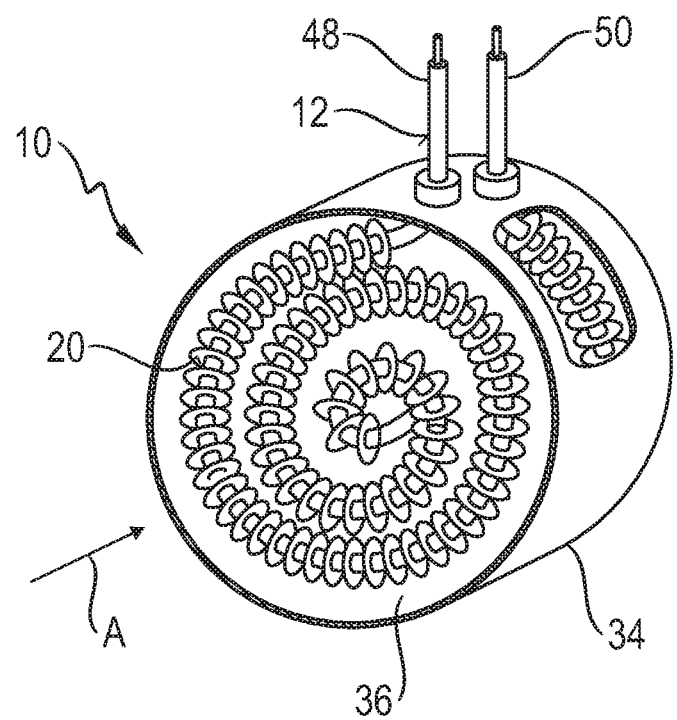
FIG. 6 is a perspective view of another alternative arrangement of the exhaust gas heating unit.

FIG. 6 shows a configuration, in which the jacket heating conductor element 12 is arranged with two spiral-like winding configurations following one another. The two ends 48, 50 to be contacted electrically can thus be guided through the exhaust gas pipe 34, for example, at a spaced location in the exhaust gas flow direction A, which spaced location corresponds approximately also to the spaced location of the two spiral-like winding areas, each lying essentially in one plane.

Figure 7:
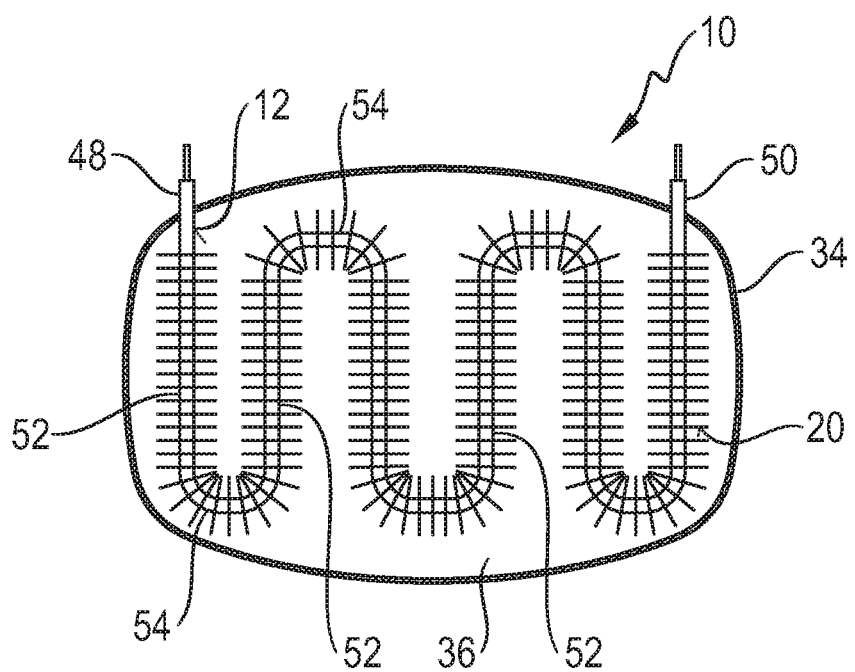
FIG. 7 is a sectional view, corresponding to FIG. 4, of an alternative arrangement of an exhaust gas heating unit.

FIG. 7 shows a configuration, in which the exhaust gas heating unit 10 is arranged in an exhaust gas pipe 34 or in an exhaust-gas-carrying housing with a flattened, approximately rectangular cross section. The jacket heating conductor element 12 is wound in this case arranged in a meandering manner and has meandering sections 52 that run approximately parallel to one another, extend each essentially linearly and are connected by respective curved areas 54 of the jacket heating conductor element 12. The shape of the exhaust gas heating unit 10 can in this way be easily adapted to the circumferential contour of the exhaust gas pipe 34 or housing receiving this exhaust gas heating unit 10, and the fact that the heat transfer surface formation 20 is arranged at the outer surface 28 of the jacket heating conductor element 12 either in a helical manner or configured with a plurality of ring washers and can thus be easily adapted to the curved or bent configuration of the jacket heating conductor element 12 contributes to this as well.

Figure 8:
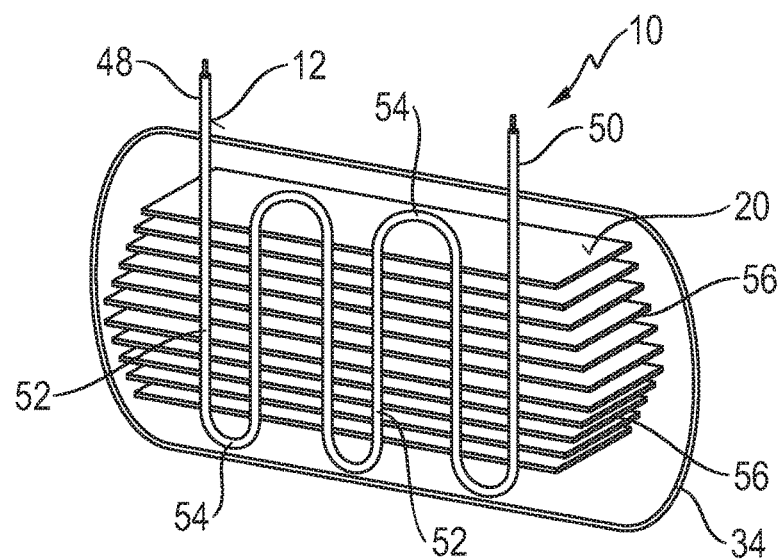
FIG. 8 is a perspective view of an alternative embodiment of an exhaust gas heating unit.

FIG. 8 shows an alternative embodiment of the exhaust gas heating unit 10, in which the jacket heating conductor element 12 is in contact with a plurality of plate-shaped heat transfer elements 56 of the heat transfer surface formation 20, which heat transfer elements 56 are arranged essentially parallel to one another. As suggested in FIG. 8, such an embodiment may also be easily adapted to many different circumferential contours of the exhaust gas pipe 34 or housing receiving the exhaust gas heating unit 10.

Figure 9:
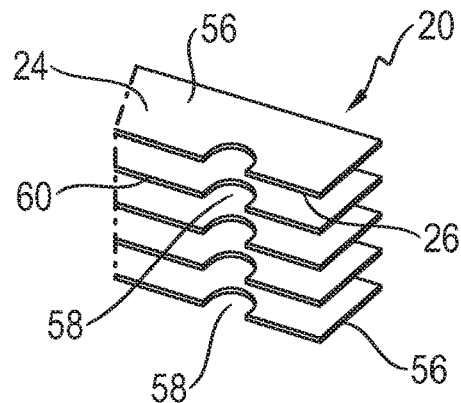
FIG. 9 is a perspective cutaway view of a plurality of plate-shaped heat transfer elements of the exhaust gas heating unit according to FIG. 8.

For an efficient transfer of heat between the jacket heating conductor element 12 and the heat transfer elements 56, the jacket heating conductor element 12 is configured as wound in a meandering manner and has the meandering sections 52, which were already described with reference to FIG. 7, and curved areas 54 connecting these meandering sections 52. As illustrated in FIG. 9, jacket heating conductor element receptacles 58 are formed in the plate-shaped heat transfer elements 56 in association especially with the meandering sections 52. These receptacles 58 are open toward a heat transfer element circumferential edge area 60 and have an essentially semicircular configuration, which is adapted to a, for example, circular outer circumferential contour of the jacket 16. The jacket heating conductor element 12 can be fitted, for example, by press fit into these jacket heating conductor element receptacles 58 or/and can be connected to the individual heat transfer elements 56 by connection in substance, for example, by soldering or welding.

To increase the stability of the exhaust gas heating unit 10 thus configured, the plate-shaped heat transfer elements 56 may be connected to one another and also to the exhaust gas pipe 34 receiving these heat transfer elements 56 or to a housing receiving these heat transfer elements 56 by holders, not shown in the figures.

Figure 10:
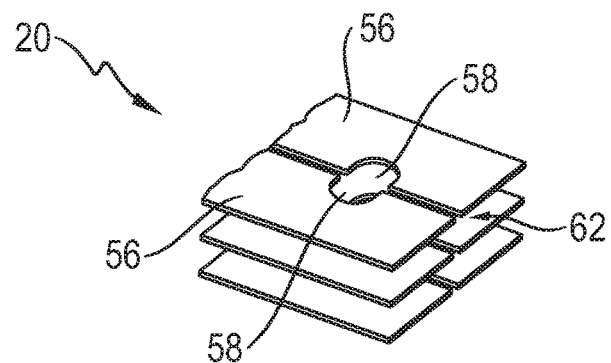
FIG. 10 is a perspective cutaway view, corresponding to FIG. 9, of heat transfer elements, each located opposite one another in pairs.

FIG. 10 shows a configuration, in which two such plate-shaped heat transfer elements 56 are each arranged located opposite one another and thus form a pair of heat transfer elements 62. In this case, the jacket heating conductor element receptacles 58, which are formed in the heat transfer elements 56 of a pair of heat transfer elements 62, are located opposite one another, so that the two heat transfer elements 56 of a respective pair of heat transfer elements 62 together essentially fully extend around the jacket 16 of the jacket heating conductor element 12 approximately in the same length area.

The entire surface available for the transfer of heat is increased due to the paired association of the heat transfer elements 56 with one another. Since the heat transfer elements 56 of a respective pair of heat transfer elements 62 are essentially not offset to one another in the direction of longitudinal extension of the jacket heating conductor element 12, the flow resistance for the exhaust gas flowing around an exhaust gas heating element 10 configured in this manner is kept low. It should be pointed out that especially if a more intense swirling shall be generated in the exhaust gas stream, the heat transfer elements 56 of a respective pair of heat transfer elements 62 may also be arranged offset to one another in the direction of longitudinal extension of the heating conductor element 12 moved past these heat transfer elements 56.

Figure 11:
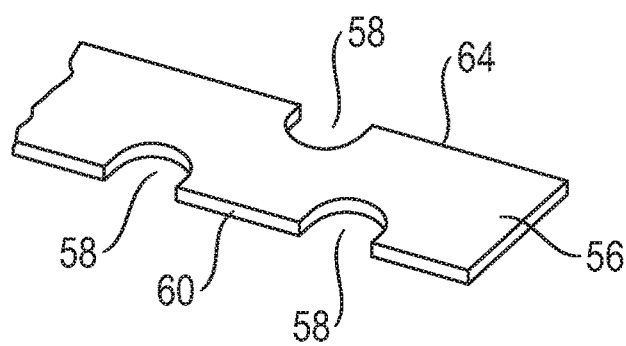
FIG. 11 is a perspective cutaway view of a heat transfer element having an alternative configuration.

FIG. 11 shows a heat transfer element 56, in which respective jacket heating conductor element receptacles 58 are formed in heat transfer element circumferential edge areas 60, 64, which are located opposite one another. It thus becomes possible to arrange at least one jacket heating conductor element 12 each on both sides, for example, on a side oriented upstream and on a side oriented downstream of the heat transfer elements 56 and to connect it permanently to same.

Figure 12:
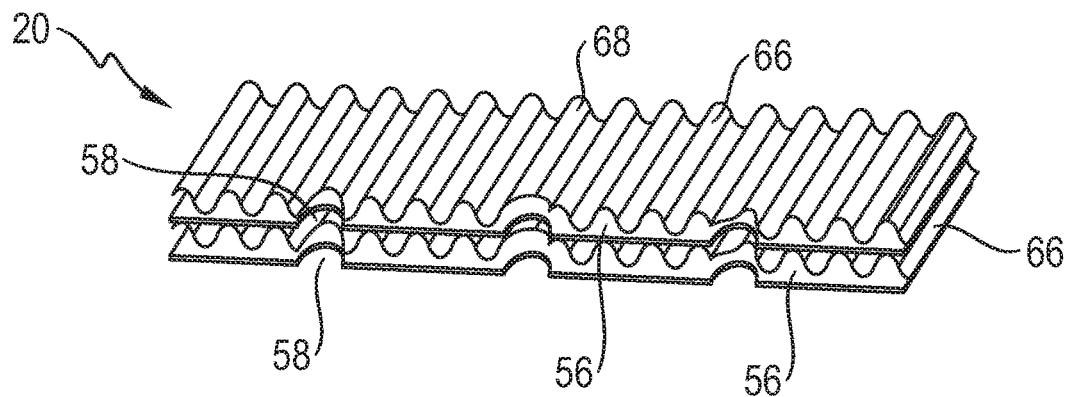
FIG. 12 is a perspective view of a layering of plate-shaped heat transfer elements with spacing elements, having a wave-shaped structure, arranged between them.
Figure 13:
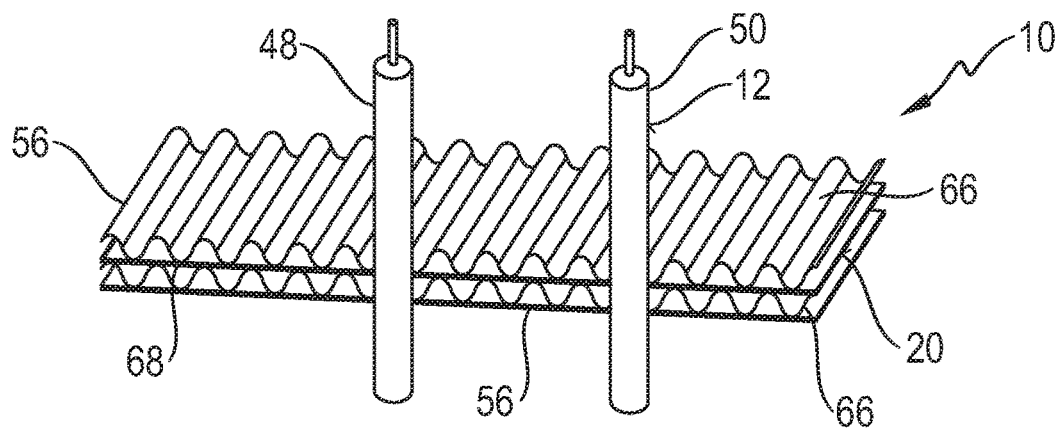
FIG. 13 is a perspective view of the heat transfer elements according to FIG. 12 in conjunction with a jacket heating conductor element.

FIG. 12 shows a configuration, in which a spacing element 66 each, which is configured with a wave-shaped structure, is arranged between the heat transfer elements 56 that are arranged essentially parallel to one another. A stable overall structure is obtained, in which the spacing elements 66 can be connected, for example, by soldering or welding or bonding at wave crest areas 68 to the heat transfer elements 56 arranged adjacent thereto. These spacing elements 66, which are preferably made of a metallic material as well, enlarge the overall surface provided for the transfer of heat and essentially fully cover the heat transfer elements 56 each arranged on both sides thereof. To provide a configuration that can be embodied in a simple manner, a respective spacing element 66 can be restored from the corresponding circumferential edge areas of the adjacent heat transfer elements 56 where jacket heating conductor element receptacles 58 are provided in the heat transfer elements.

The spacing elements 66 may be configured such that exhaust gas can flow through them in order to avoid the formation of flow shadow areas or areas that are difficult to flow over. For example, these spacing elements 66 may be made of wire mesh or perforated sheet metal or expanded metal and thus have a plurality of openings, which make it possible for exhaust gas to pass through.

Such a connected structure of the heat transfer surface elements 56 may also be supported at an exhaust gas pipe or at a housing carrying these heat transfer surface elements 56 by means of a holding element, not shown, so that vibrations also occurring during the vehicle operation cannot lead to the development of a change in position of an exhaust gas heating unit thus configured in an exhaust gas pipe or in a housing.

Figure 14:
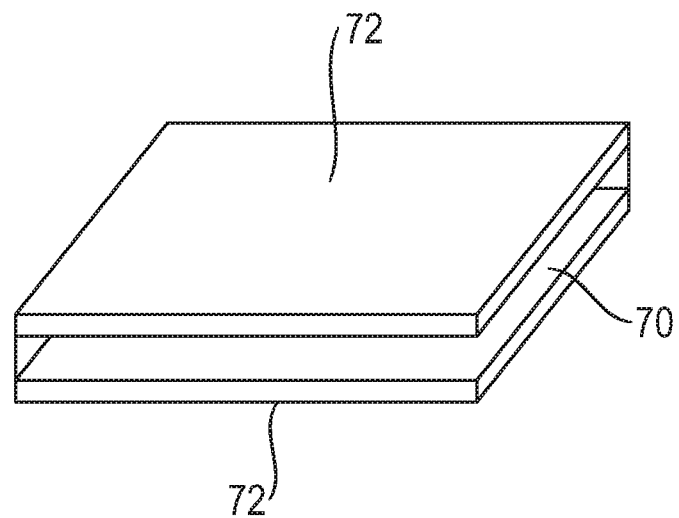
FIG. 14 is a detail view of a heat transfer element coated with catalytically active material.

FIG. 14 shows a detail of a heat transfer element 70, which has a plate-shaped configuration, for example, which is coated with catalytically active material 72 in at least some areas on its outer surface, around which exhaust gas can flow. For a stable bonding of such catalytically active material, it is advantageous for such a heat transfer element 70 to be made of aluminum or an aluminum alloy with a high aluminum content. During the application of such catalytically active material 72, the metallic surface with a large inner surface is at first usually coated with a porous, ceramic oxide coating, which is called washcoat. The catalytically active material is then applied to this coating, for example, in a so-called impregnation process.

By applying catalytically active material 72 to one or more heat transfer elements 70, it becomes possible to bring the heat transfer elements 70 or the catalytically active coating 72 very rapidly to a temperature, at which the catalytic reaction can take place during the flowing around of the exhaust gas, by energizing one or more jacket heating conductor elements connected therewith. This makes it possible to provide a catalytic action in the exhaust system even in the start phase of an internal combustion engine almost without any time delay and thus also to markedly lower the emission of harmful substances immediately after starting an internal combustion engine.

Such a coating with catalytically active material may be provided regardless of the configuration of the heat transfer surface formation. In particular, one or more of the heat transfer elements may be coated on at least one side, but preferably fully with catalytically active material in case of each of the configurations shown in FIGS. 1-13.

The catalytically active material 72 is selected as a function of which type the catalytic converter action provided shall be. If, for example, the exhaust gas heating unit 10 shall be active as a three-way catalytic converter, the catalytically active material may contain platinum, palladium, rhodium or mixtures thereof. The temperature resistance of structural promoters improving the catalytically active material 72 may also be provided in this coating. If the action of a diesel oxidation catalytic converter shall be achieved, it is advantageous to use platinum and palladium as the principal components of the catalytically active material 72. Mixed oxides may also be used. If the action of an SCR catalytic converter shall be achieved, it is advantageous for the catalytically active material to be made of iron zeolite material, copper zeolite material or vanadium oxide material, e.g., vanadium pentoxide.

Figure 15:
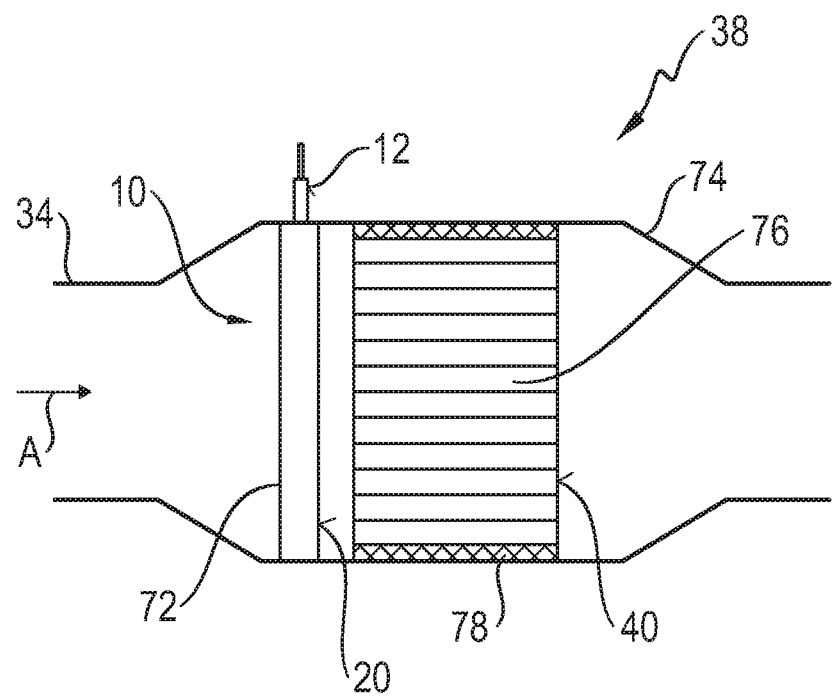
FIG. 15 is a schematic view of an exhaust system with an exhaust gas heating unit upstream in relation to a catalytic converter unit.

This catalytic effect can be used in an especially efficient manner if, as is illustrated in FIG. 15, such an exhaust gas heating unit 10 made of catalytically active material is arranged, for example, in a catalytic converter housing 74 upstream in relation to the catalytic converter unit 40 arranged therein. It should be pointed out that in typical construction the catalytic converter unit 40 may have a monolith 76, which is made, for example, of catalytically active material or is coated with same, which monolith 76 can be held in the catalytic converter housing 74 by a fiber mat 78 surrounding this catalytic converter unit 40.

Provisions are preferably made in case of such a configuration for the catalytically active material 72 provided on the exhaust gas heating unit 10 and the catalytic converter unit 40 to provide the same type of a catalytic reaction. Thus, in a start phase, i.e., immediately after starting the internal combustion engine 32, which is illustrated, for example, in FIG. 3, by electrical energization, the exhaust gas heating unit 10 with the catalytically active material 72 provided on it can very rapidly be brought to the temperature necessary for carrying out the catalytic reaction and thus be active as catalytic converter, even before the catalytic converter unit 40 has reached the temperature needed for this. The catalytic converter unit 40 is heated, on the one hand, by the exhaust gas emitted from the internal combustion engine 32 also in the start phase and by the exhaust gas flowing around the exhaust gas heating unit 10, on the other hand, and is thus likewise rapidly brought to a sufficiently high temperature in order to carry out the catalytic reaction in this exhaust gas heating unit 10 as well. If this temperature is reached, the energization of the jacket heating conductor element 12 of the exhaust gas heating unit 10 can be ended. This can be either recognized by providing a temperature signal, or a defined time can be provided, throughout which the exhaust gas heating unit 10 is energized in the start phase of the internal combustion engine 32.

Figure 16:
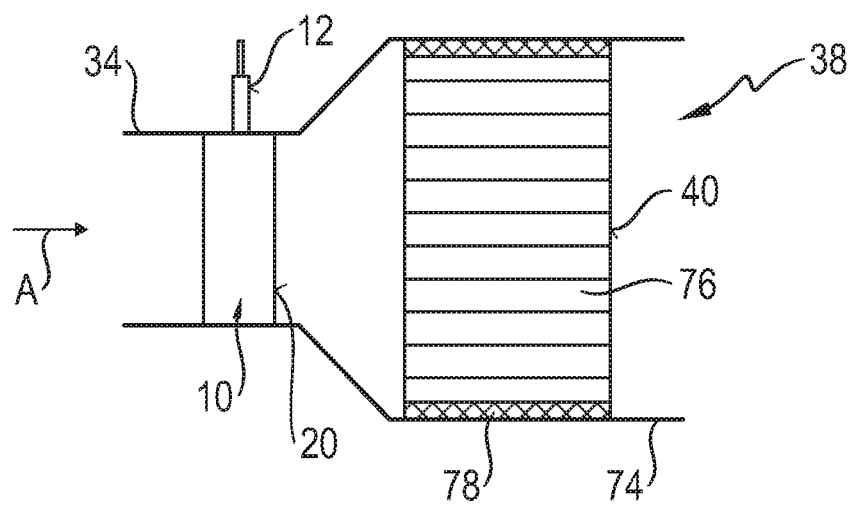
FIG. 16 is a schematic view of an exhaust system with an exhaust gas heating unit arranged in an exhaust gas pipe upstream in relation to a catalytic converter unit.

FIG. 16 shows an embodiment, in which the exhaust gas heating unit 10 is not accommodated in the catalytic converter housing 74 upstream in relation to the catalytic converter unit 40, but rather in the exhaust gas pipe 34 adjoining the upstream end thereof. Such an arrangement may be advantageous, for example, if the exhaust gas heating unit 10 shall have the elongated configuration shown in FIGS. 1 and 2.

Figure 17:
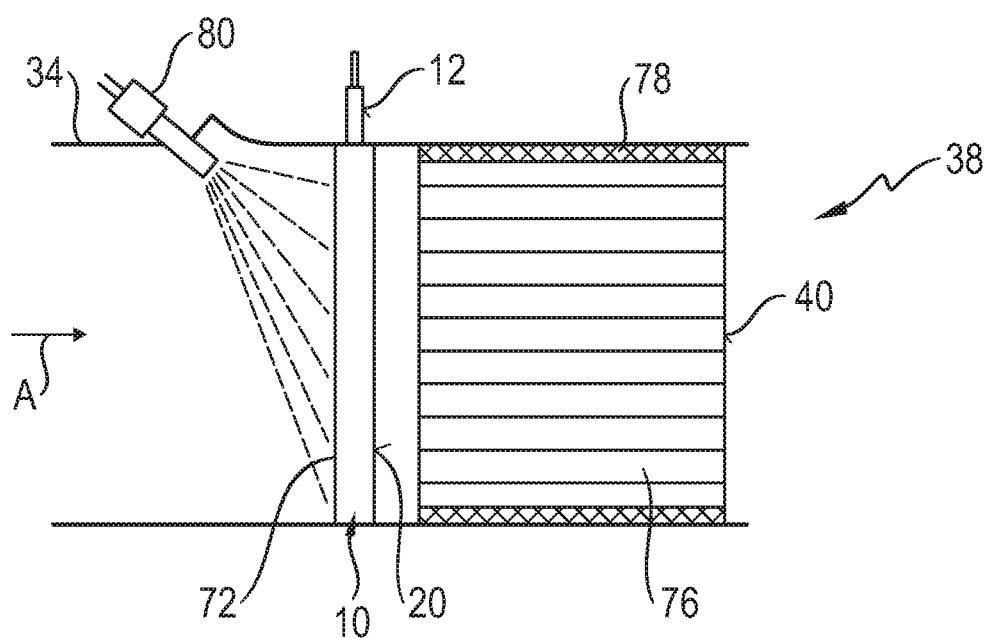
FIG. 17 is a schematic view of an exhaust gas heating unit with a hydrocarbon release device associated with same.

FIG. 17 shows an exhaust system 30, in which a hydrocarbon release device 80 is provided in association with the exhaust gas heating unit 10 that is likewise made, for example, of catalytically active material 72. Like an injector, this hydrocarbon release device 80 may inject hydrocarbon into the exhaust gas stream, i.e., for example, the fuel also used for operation of the internal combustion engine 32, in the direction towards the exhaust gas heating unit 10. The hydrocarbon reacts on the hot surface of the exhaust gas heating unit 10, so that the reaction of the hydrocarbon releases reaction heat, which can additionally be transferred to the exhaust gas flowing in the direction of the catalytic converter unit 40, which then follows downstream. Such an embodiment is especially advantageous if the catalytic converter unit 40 is configured as an SCR catalytic converter, at which a selective catalytic reduction is carried out by reaction of the reducing agent, i.e., for example, a urea-water solution, injected by a reducing agent release device, not shown. A particle filter used as an exhaust gas treatment unit 38 may also be regenerated by the injection of hydrocarbon independently of the operation of the internal combustion engine 12.

In another embodiment, hydrocarbon transported in the exhaust gas stream may also be provided by this hydrocarbon being emitted from the internal combustion engine 32 deliberately. For this purpose, it can be ensured, for example, by corresponding setting of the ignition angle or by late fuel injection, that only a part of the fuel ignites during the combustion taking place in the internal combustion engine 32, while a part of the fuel is emitted unburned and is available for reaction at the exhaust gas heating unit 10 or/and at the exhaust gas treatment unit 38.

While specific embodiments of the invention have been shown and described in detail to illustrate the application of the principles of the invention, it will be understood that the invention may be embodied otherwise without departing from such principles.

What is claimed is:

1. An exhaust system for an internal combustion engine, the exhaust system comprising:
   an exhaust gas flow duct for a flow of exhaust gas in an exhaust gas flow direction; and
   at least one exhaust gas heating unit arranged in the exhaust gas flow duct, the exhaust gas heating unit comprising:
   a jacket heating conductor element comprising a jacket, an electrical heating conductor extending in the jacket, and insulating material surrounding the electrical heating conductor; and
   a heat transfer surface formation arranged on an outer side of the jacket and in heat transfer contact with the jacket, wherein the heat transfer surface formation comprises a heat transfer element extending along the jacket heating conductor element such as to helically surround the jacket heating conductor element in at least some areas, the jacket heating conductor element having two ends for electrically connecting the jacket heating conductor element to a voltage source outside the exhaust gas flow duct, the jacket heating conductor element being arranged with a spiral form, wherein the jacket heating conductor element helically surrounded by the heat transfer element is arranged in a double-spiral winding configuration in a plane that is essentially at right angles to the exhaust gas flow direction, such that the two ends of the jacket heating conductor element are positioned in the same length area of the exhaust gas flow duct in the exhaust gas flow direction.

2. An exhaust system in accordance with claim 1, further comprising an exhaust gas treatment unit comprising a catalytic converter unit or a particle filter unit, wherein the exhaust gas heating unit is arranged in an exhaust gas flow direction in the exhaust gas flow duct upstream in relation to the exhaust gas treatment unit.

3. An exhaust system in accordance with claim 2, wherein a heat transfer surface of the heat transfer surface formation is formed with catalytically active material in at least some areas, wherein the catalytically active material and the catalytic converter unit are associated with the same type of catalytic converter.

4. An exhaust system in accordance with claim 1, wherein a hydrocarbon release device is associated with at least one exhaust gas heating unit for releasing hydrocarbon into the exhaust gas stream upstream in relation to the exhaust gas heating element.

5. An exhaust system in accordance with claim 1, wherein:
the jacket is made of a metallic material; or
the heat transfer surface formation is connected to the jacket with a pressing on or shrinking on frictional engagement; or
the heat transfer surface formation is connected to the jacket by a connection in substance; or
any combination of the jacket is made of a metallic material and the heat transfer surface formation is connected to the jacket with a pressing on or shrinking on frictional engagement and the heat transfer surface formation is connected to the jacket by a connection in substance.

6. An exhaust system in accordance with claim 1, wherein helical portions of the heat transfer element are arranged along the at least some areas of the jacket heating conductor element in a shape of a screw.

7. An exhaust system in accordance with claim 1, wherein the jacket heating conductor element is configured to extend linearly in at least some areas.

8. An exhaust system in accordance with claim 1, wherein a heat transfer surface of the heat transfer surface formation is formed with catalytically active material in at least some areas.

9. An exhaust system in accordance with claim 8, wherein:
the heat transfer element of the heat transfer surface formation is coated with catalytically active material;
the heat transfer element is made of aluminum material.

10. An exhaust system in accordance with claim 8, wherein the catalytically active material comprises:
platinum; or
palladium; or
rhodium; or
any combination of platinum and palladium and rhodium.

11. An exhaust system in accordance with claim 8, wherein the catalytically active material comprises:
iron zeolite material; or
copper zeolite material; or
vanadium oxide material; or
any combination of iron zeolite material and copper zeolite material and vanadium oxide material.

12. An exhaust system for an internal combustion engine, the exhaust system comprising:
an exhaust gas flow duct for a flow of exhaust gas in an exhaust gas flow direction; and
at least one exhaust gas heating unit arranged in the exhaust gas flow duct, the exhaust gas heating unit comprising:
a jacket heating conductor element comprising a jacket, two electrical heating conductors extending in the jacket next to one another, and insulating material surrounding the electrical heating conductors; and
a heat transfer surface formation arranged on an outer side of the jacket and in heat transfer contact with the jacket, wherein the heat transfer surface formation comprises a heat transfer element extending along the jacket heating conductor element such as to helically surround the jacket heating conductor element in at least some areas, the jacket heating conductor element having a first end for electrically connecting the two electrical heating conductors to a voltage source outside the exhaust gas flow duct, the jacket heating conductor element being arranged with a spiral form, wherein the jacket heating conductor element helically surrounded by the heat transfer element is arranged in a single-spiral winding configuration in a plane that is essentially at right angles to the exhaust gas flow direction, the jacket heating conductor element having a second end positioned in a central area of the single-spiral configuration, the two electrical heating conductors merging into one another at the second end of the jacket heating conductor element.

\* \* \* \* \*